(12) United States Patent
Kaufhold et al.

(10) Patent No.: US 12,007,544 B2
(45) Date of Patent: Jun. 11, 2024

(54) METHOD AND APPARATUS FOR CAPTURING AN IMAGE OF AN OBJECT USING A SCANNING MICROSCOPE

(71) Applicant: CARL ZEISS MICROSCOPY GMBH, Jena (DE)

(72) Inventors: Tobias Kaufhold, Jena (DE); Frank Klemm, Jena (DE); Thomas Egloff, Jena (DE); Mirko Liedtke, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 501 days.

(21) Appl. No.: 17/309,007

(22) PCT Filed: Sep. 4, 2019

(86) PCT No.: PCT/EP2019/073573
§ 371 (c)(1),
(2) Date: Apr. 12, 2021

(87) PCT Pub. No.: WO2020/057977
PCT Pub. Date: Mar. 26, 2020

(65) Prior Publication Data
US 2022/0236548 A1    Jul. 28, 2022

(30) Foreign Application Priority Data
Sep. 20, 2018   (DE) .......................... 102018216038.4

(51) Int. Cl.
*G02B 21/00*   (2006.01)
(52) U.S. Cl.
CPC ....... *G02B 21/008* (2013.01); *G02B 21/0036* (2013.01)

(58) Field of Classification Search
CPC .............. G02B 21/008; G02B 21/0036; G02B 21/0024; H04N 1/0283; H04N 2201/04; H04N 2201/04755; H04N 2201/04768
See application file for complete search history.

(56) References Cited

U.S. PATENT DOCUMENTS

| | | | |
|---|---|---|---|
| 6,037,583 A | 3/2000 | Moehler et al. | |
| 6,914,238 B2 | 7/2005 | Engelhardt et al. | |

(Continued)

FOREIGN PATENT DOCUMENTS

| | | |
|---|---|---|
| DE | 19702752 C2 | 12/2001 |
| DE | 102007008009 B3 | 8/2008 |
| DE | 10261155 B4 | 5/2010 |

OTHER PUBLICATIONS

International Search Report and Written Opinion from PCT Apn No. PCT/EP2019/073573, mailed Jan. 2, 2020, 7 pages.

*Primary Examiner* — Michael Lee
(74) *Attorney, Agent, or Firm* — Brake Hughes Bellermann LLP (57) ABSTRACT

A method for capturing an image of an object includes guiding a scanning beam along a scanning trajectory over the object using a scanner, with the scanning movement being periodic in a direction. The scanning movement is sampled at a first sampling frequency for detecting and capturing a current position of the scanner as position values and radiation from the object is captured as captured sampling values at a second sampling frequency. Current values of the amplitude and the phase of the scanning movement are calculated. A current amplitude, phase and/or frequency and future changes in the amplitude, phase and/or frequency over time are calculated. An image grid is set, with grid elements being assigned the sampling values based on times at which the scanning beam crosses or will cross at least one boundary of the grid elements.

13 Claims, 8 Drawing Sheets

(56) References Cited

U.S. PATENT DOCUMENTS

| | | | |
|---|---|---|---|
| 8,031,926 B2* | 10/2011 | Sutko | G06V 20/693 |
| | | | 382/128 |
| 2004/0217270 A1 | 11/2004 | Publicover et al. | |
| 2007/0291111 A1 | 12/2007 | Ladha | |
| 2008/0277582 A1* | 11/2008 | Shi | G01Q 10/06 |
| | | | 73/105 |
| 2010/0044556 A1* | 2/2010 | Onuma | H04N 1/053 |
| | | | 331/15 |
| 2013/0015367 A1* | 1/2013 | Cui | G01B 9/02091 |
| | | | 356/451 |
| 2015/0323774 A1 | 11/2015 | Lippert et al. | |

* cited by examiner

METHOD AND APPARATUS FOR CAPTURING AN IMAGE OF AN OBJECT USING A SCANNING MICROSCOPE

CROSS REFERENCE TO RELATED APPLICATIONS

This application is a 35 U.S.C. § 371 National Phase Entry Application from PCT/EP201/073573 filed Sep. 4, 2019, designating the United States and claiming priority to German Application 10 2018 216 038.4 filed Sep. 20, 2018, the disclosures of which are incorporated by reference herein in their entireties.

TECHNICAL FIELD

This disclosure relates to a method and an arrangement for scanning capture or manipulation of an object using a microscope.

BACKGROUND

A wide variety of solutions for correcting the sampling positions of the sensor elements, which may have recorded signals that are "distorted" both in space and time, within the scope of recording images with scanners, or else for minimizing these by way of an appropriately designed scanner control, have been disclosed in the prior art.

Thus, for example, German Patent No. DE 102 61 155 B4 has disclosed a method in which a time information item is assigned to each picture element (pixel), the time information item describing the time at which the associated spatial region was scanned.

U.S. Pat. No. 6,914,238B2 has disclosed a scanning microscope, in which a position signal corresponding to the time profile of the scanning process is assigned to each detection signal.

Further, German Patent No. DE 197 02 752 C2 has disclosed a correction of the control movement (predistortion) by way of Fourier coefficients. What is disadvantageous here is that the once-adjusted control of the scanner is unable to react to deviations between position signal and detection signal due to thermal or other non-systematic reasons.

SUMMARY

This disclosure is based on the object of proposing a method for capturing an image that is improved over the prior art. Moreover, an apparatus for carrying out the method is specified.

The object is achieved by a method as claimed in claim 1 and an apparatus as claimed in claim 13. Advantageous developments are set out in the dependent claims.

The method serves to capture an image of an object. In the method, at least one scanning beam is guided along a scan trajectory or a scanning trajectory over the object, for example, a sample, using at least one optical scanning apparatus, in particular, a scanner. The movement of the scanner, i.e., the scanning movement, is at least intermittently periodic in at least one direction. The method includes the steps described below but may include additional method steps in some implementations.

In one step, the scanning movement of the at least one scanner is sampled with a first sampling cycle at a first sampling frequency for detecting and capturing a current position of the scanner.

Moreover, radiation emanating from the object is captured as captured sampling values with a second sampling cycle at a second sampling frequency, for example by means of at least one detector. This radiation, which can also be referred to as detection radiation, can include a portion of illumination radiation reflected by the object. In addition, or as an alternative thereto, the detection radiation can be emission radiation excited in the object. By way of example, fluorescence radiation can be excited by way of excitation radiation in the object and can be emitted by the latter. The captured current positions (position values) of the scanner can be used in a further step to calculate current values of the amplitude, the phase, and the frequency of the scanning movement of the at least one scanner. A function, in particular, a mathematical function such as a regression function, for example, can be ascertained on the basis of the calculated current values for the purposes of estimating future changes in the amplitude, phase, and/or frequency over time. This function is also referred to as movement function.

An image grid with grid elements can be set. The captured sampling values can be assigned to the grid elements. This assignment can be implemented by virtue of times at which the scanning beam respectively crosses or will cross at least one boundary of adjacent grid elements being calculated on the basis of the ascertained function.

The sampling values of each grid element captured within a time interval delimited by the times can be assigned to the relevant grid element as resultant image data. The grid elements can be combined with the resultant image data to form the resultant image.

A base cycle can be generated and can be made available for the purposes of carrying out the method. The first sampling cycle can be chosen to equal the base cycle. The respective first sampling cycle can be synchronous with the base cycle. In further implementations of the method, the first sampling cycle can be an integer multiple or integer fraction of the base cycle.

In one implementation of the method according to the invention, the second sampling cycle can be time-variable. Moreover, it need not correspond to a multiple or divisor of the first sampling cycle and can be asynchronous in relation to the latter. The respective capture times caused by the second sampling cycle can be recorded and taken into account when assigning the sampling values to the grid elements. By way of example, the second sampling cycle can be specified by an external signal.

Sampling the scanning movement, i.e., the capture of the respective current position of the scanner, can be implemented at the first sampling frequency and can be equidistantly in time, i.e., the base cycle can be remain unchanged.

The scanning unit or scanner can sweep over the scanned object at a scanning frequency.

By way of example, a periodic scanning movement can be approximately sinusoidal. Moreover, use can be made of a scanning movement with linear sections, such as a sawtooth or triangular movement. The control underlying the periodic scanning movement can be generated by a restricted number of harmonic orders, for example.

The terms picture element, pixel, and image pixel, which are used synonymously in this description, are each understood to mean a section of a resultant image. The resultant image can include a number of picture elements. Each picture element can be characterized by resultant image data in respect of its content, e.g., in respect of color and intensity. As a simplification, the assumption can be made that a grid element corresponds to a picture element (pixel, image pixel) since, as a rule, the captured sampling values assigned to a grid element correspond to the resultant image data of the grid element and of the picture element.

The captured scanning movement, i.e., the temporal sequence of the position signals and the position values derived therefrom, can be subjected to a frequency analysis. The latter can include a sine and cosine correlation with the fundamental frequency to be expected and a subsequent coordinate transformation for calculating the current phase and current amplitude. The future amplitude, phase, and frequency can be calculated as a movement function from a number of current values of amplitude and phase of the scanning movement by means of regression analysis. By way of example, the regression can be a linear regression of the least squares (least square estimator). By way of example, the movement function can be sinusoidal, triangular, or sawtooth. In addition, or as an alternative thereto, the movement function can be available in tabulated form, for example as a lookup table (LUT) or as a parameter of a harmonic synthesis or spline function.

In one implementation, the first sampling frequency can be chosen to be less than the second sampling frequency. By way of example, the second sampling frequency can be a multiple of, e.g., 2, 4, 8 or 16-times, the first sampling frequency. Thus, the first sampling frequency can be, e.g., 10 MHz, and the second sampling frequency can be 80 MHz. As a result, a plurality of sampling values can be captured between two times at which the current position of the scanner is captured.

The captured sampling values captured within a time duration including a time at which the scanning beam crosses or has crossed a boundary between two grid elements can be proportionally assigned to the relevant grid elements in one possible implementation. This avoids temporal artifacts as a result of asynchronicity of sampling cycle and scanning frequency (movement moiré). Moreover, empty grid elements are avoided and an adequate distribution of the captured sampling values is achieved.

It is also possible for the captured sampling values assigned, or to be assigned, to a grid element to be normalized and to be assigned to the grid element as normalized image data. The formation of a mean value, for example, can be related to the number of captured sampling values of the relevant grid element in this case. Such a normalization can lead to better comparability of the contents of the grid elements. Normalized image data represent a form of resultant image data.

Grid elements with captured sampling values can be converted in groups into grid elements with resultant image data. This leads to more effective combination by calculation and can be implemented, for example, line-by-line. Grid elements of a plurality of lines, of whole images (image-by-image) or even of a plurality of images (z-stack-by-z-stack) can also be converted in this way.

The phase and frequency can also be used to select the times for calculating further current values of amplitude and phase. Dynamic adaptation within the meaning of closed-loop control leads to an increased stability of the method. The scanning frequency need not be accurately known in advance.

The two-dimensional or three-dimensional sampling grid can be chosen in each case with grid elements of different form and/or size. Thus, the virtual grid elements can be formed in equidistant fashion, with two-dimensional or three-dimensional rotation or in any desired form with respect to one another and/or along at least one of their dimensions. An equidistant arrangement is easy to handle from a computational point of view. Rotated and/or differently formed grid elements facilitate a flexible adaptation of the sampling grid to the object and to the scanning movement. The grid elements can also be chosen to be distorted in order to achieve a distortion correction. Advantageously, the grid elements can be chosen in such a way that, as a result, a resultant image with as few imaging aberrations as possible is obtained. Thus, it is possible to combine grid elements of different form and size with one another. The size of the grid elements, and hence the duration of a time interval during which the scanning beam crosses the relevant grid element can be selected on the basis of the future scanning movement.

The object underlying this disclosure can be further achieved by an apparatus for capturing an object. Such an apparatus includes at least one scanner for guiding a scanning beam along a scanning trajectory over the object. Here, the scanning movement of the scanner is at least intermittently periodic in at least one direction. There is at least one position detector for sampling the scanning movement of the scanner with sampling cycles at a first sampling frequency.

Moreover, there is at least one detector for capturing radiation emanating from the object (detection radiation) as captured sampling values. The capture can be carried out with a second sampling cycle at a second sampling frequency. Furthermore, an evaluation unit can be configured to:
- calculate current values of the amplitude and the phase of the scanning movement of at least one scanner;
- ascertain a (mathematical) function for estimating future changes in the amplitude, phase and/or frequency over time on the basis of the calculated current values,
- set an image grid, the grid elements of which are assigned the captured sampling values by virtue of:
    (limit) times at which the scanning beam respectively crosses or will cross at least one boundary of the grid elements being calculated by means of the ascertained (mathematical) function,
    and sum the sampling values within a grid element captured within the (limit) times and assign these to the relevant grid element as resultant image data,
- and combine the grid elements with the resultant image data to form a resultant image in order to capture the image of the object.

Techniques described herein are based on the basic idea that conventional precision scanners for scanning objects require a complicated open-loop or closed-loop control of the scanners which optimizes an assignment of the image pixels exactly to the desired sampling location even if the scanner or the scanning beam deviates, for example, due to ambient influences, from its optimal, desired scan trajectory. Techniques described herein circumvent this complicated open-loop or closed-loop control by virtue of leaving the scanner uninfluenced and instead detecting the scanning movement of the freely operating scanner by optical (e.g., using a back-side detection) or other means. These detection signals are referred to as position detector signals or position signals.

The scanning of the object can be implemented multiple times and approximately periodically in at least one direction. An object can be scanned in two dimensions as a result of a line advance movement in a direction that is usually perpendicular thereto. The returned detection light from the object can be captured as sampling values at time intervals. The position signal can be decomposed into its fundamental parameters (amplitude, frequency, phase and possibly an offset). By way of the relative movement of the scanner during a scanning period and the parameters of the periodic movement, it is possible to assign corresponding times to the grid elements, with the definition of the grid being freely selectable.

In general terms, the techniques describe herein include: synchronization or scan position preparation and conversion of the captured sampling values into resultant image data, as outlined below:

A) Synchronization and reconstruction of the scanning movement
1) generating a time base by providing a base cycle and using this base cycle as a temporal reference;
2) capturing the position signals, with the position signals being captured synchronously with the base cycle;
3) ascertaining periodic scanning parameters, for example by means of sine/cosine correlation of the captured scanning movement, and ascertaining current values of the amplitude and phase and optionally an offset (spatial offset);
4) regressing the parameters and estimating the future movement parameters and calculating the zero crossings or the frequency; updating the times used for ascertaining the scanning parameters and optionally providing these metadata to other components in order to carry out the subsequent image reconstruction decentrally.

B) Conversion of the sampling values into resultant image data
1) Detection: capturing sampling values and the detection times thereof, an indirect capture of the detection times is possible when the sampling values are captured synchronously with the base cycle;
2) ascertaining the times of the capture of sampling values and calculating times when boundaries of the grid elements (pixel boundaries) are crossed from the calculated parameters of the scanning movement(s);
3) Image reconstruction: combining the individual captured sampling values within boundaries of the grid elements and dividing captured image data located on a boundary between two grid elements;
4) combining the image data resultant thus or combining a 3-dimensional image stack to form a complete image document (resultant image).

Compared to the prior art, the techniques described herein offer a number of advantages. Thus, the captured sampling values are obtained by means of a scanning movement that is periodic in at least one direction and does not require precision scanners that are regulated or corrected with much outlay. Moreover, thermal and/or temporal changes of the scanning movement can be largely compensated when the method according to the invention is carried out. The invention facilitates a reliable assignment to the respectively associated picture elements (pixels, image pixels) even in the case of noisy position signals. This is important, in particular, for the typically high scanning frequencies of resonance scanners.

A further advantage consists of the fact that object-identical images without image errors and artifacts can be obtained for a scanning microscope with little computational complexity, which is preferably realizable in hardware. Furthermore, all ascertained parameters of the position signal or of the scanning movement can be distributed to any other desired image detector in order to convert said parameters into equidistant image information items. This is not directly possible with position signals.

In an implementation, it is possible for the capture of the sampling values to be implemented in non-synchronous fashion with respect to the base cycle or a multiple or fraction thereof. By way of example, this is advantageous if the object is scanned using a pulsed light source, for example, a titanium sapphire laser. The latter runs with a dedicated cycle, and the image data are captured synchronously therewith. In addition, the time intervals between individual pulses and hence of the sampling are not equidistant over time. Firstly, the detection times or capture times need to be captured; secondly, these are taken into account when calculating the grid elements and the times assigned thereto. Hence, there is no need for synchronicity between the capture of the image data and the base cycle. Without pulse-synchronous detection, the sampling values have a varying signal which can no longer be corrected when combining the image by calculation and which leads to so-called movement moiré.

In a further possible implementation, a plurality of scanning beams can be guided along respective scanning trajectories over the object by means of at least one scanner. Here, the scanning beams have a spatial offset from one another in at least one direction. The sampling values captured as the effect of a scanning beam in each case can be assigned to the grid elements of the image grid, with the offset being taken into account. The sampling values can be combined by calculation to form resultant image data and a resultant image, as described above for individual scanning beams. It is also possible for mean values of the plurality of sampling values to be formed and for the resultant image data and the resultant image to be generated preceding therefrom.

A further implementation provides for different regions of the image grid to be combined to form an image using the sampling values from the multiplicity of scanning trajectories (time-simultaneous scanning). It is also possible for the sampling values relating to the different scanning beams to be used to generate different channels of a resultant image.

With the techniques described herein, it is possible to capture and optionally correct a number of movement errors of the scanning apparatus, for example, of the scanner, and it is possible to capture, calculate, and correct parasitic vibrations perpendicular to the scanning direction (wobble), errors between advance and return of the scanning movement (bidirectional errors), crosstalk between the movement axes, linearity errors, amplitude errors, and/or offset errors. It is possible to capture the maximum amplitude, which is advantageous, in particular, in the case of resonance scanners and multipoint scanning applications. The second sampling frequency can be adapted on the basis of the captured scanning movement in order to further improve the image quality.

With the techniques described herein, it is possible to smooth already captured position signals and position signals with a poor quality might be rendered usable for the first time under certain circumstances. Future position signals can be predicted, in particular, on the basis of the regression function. The quality of the prediction can be positively influenced if there is closed-loop control of the correlation interval on the basis of the calculated zeros, phases or frequencies (feedback). The captured image data can be evaluated substantially in real time, advantageously limiting the amount of data needed to be stored. Alternatively, storing the image data and subsequent processing is also possible. Furthermore, actuators and light sources can be controlled virtually in real time and synchronously with the scan.

By way of example, detection systems can be advantageously operated with the method according to the invention if said detection systems have a multiplicity of individual detectors operating in parallel. By way of example, such an individual detector can be an avalanche photodiode (APD)

of an array of APDs (SPAD array; single photon avalanche diode array) or of an array of PMTs (multichannel PMT; photomultiplier tube) or of other detectors. Each of the individual detectors can receive the information items in relation to the boundaries of the grid elements, for example, and directly processes the data. This allows data to be combined and output as a complete image data package, for example provided with a single timestamp. In the case of an implementation in a chip, there can be a high internal data stream of, e.g., 80 GByte/s, while only a smaller data stream of, e.g., 80 Mbyte/s, leaves the chip.

Moreover, it is possible to selectively impinge illumination radiation on grid elements on the basis of the movement function and the estimated future course of the scanning movement. This allows manipulations with a likewise selected intensity, polarization and/or wavelength of the illumination radiation to be brought about in predetermined grid elements. By way of example, molecules or structures of the object provided with fluorescence markers are excited to emit fluorescence radiation. The illumination radiation can also be switched off or altered in terms of its intensity, wavelength and/or polarization while sweeping over other predetermined grid elements in order precisely to not bring about any changes to the object, i.e., not bring about any manipulation, there. By way of example, it is possible not to illuminate grid elements from selected regions of the object in order to locally and/or temporarily avoid damaging effects of the illumination radiation (blanking).

BRIEF DESCRIPTION OF THE DRAWINGS

The invention will be explained in more detail below on the basis of figures and exemplary embodiments. In the drawings.

DETAILED DESCRIPTION

Figure 1:
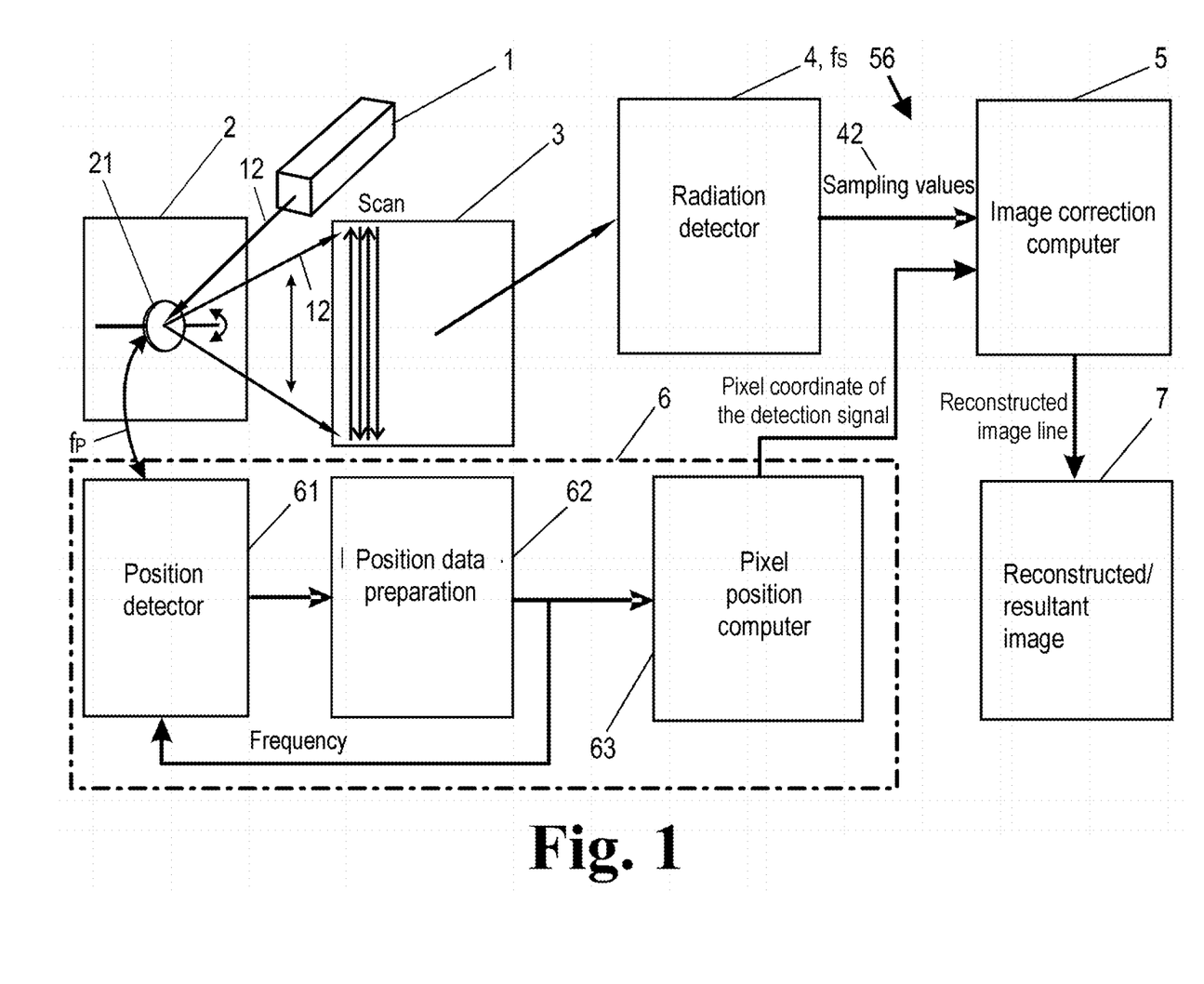
FIG. 1: shows a schematic illustration of an apparatus as a block diagram, according to an implementation.

FIG. 1 illustrates an apparatus including a radiation source 1, for example, a laser light source, for providing a scanning beam 12, which strikes a mirror 21 of an oscillating scanner 2 in order to scan an object 3 in linear fashion along a scan trajectory (symbolized by arrows of alternating direction). The scan movement, in this case the scanning movement, is periodic in at least one direction. The portion of the scanning beam reflected by the object 3 leads to a linear signal sequence (sampling values 42) on account of the scanning movement of the mirror 21, said signal sequence being recorded by a radiation detector 4 at a second sampling rate (sampling frequency; second sampling frequency $f_S$). Alternatively, emission radiation, for example fluorescence radiation, may be brought about in the object 3 by the radiation of the scanning beam 12, and this can be captured as detection radiation by means of the radiation detector 4.

The scanner 2 can be a non-synchronized scanner, preferably a freely oscillating resonance scanner or else a galvanoscanner (galvo-scanner). To realize feedback/coupling of the excitation in respect of location and time of the object 3 caused by the scanning movement thereof, for example, to take account of, or to compensate, nonlinearities and variations in the scanning movement as a result of ambient influences, the movement sequence of the scanner 2 can be sampled and captured by means of a position detector 61 of a scan analysis unit 6. This can be implemented by a position detection 611 (see FIGS. 2a to 4) of the mirror 21 with a first sampling cycle at a specified first sampling frequency, $f_P$. In relation to this first sampling frequency, $f_P$, the sampling frequency or the second sampling frequency, $f_S$, of the radiation detector 4 can be chosen such that the latter is greater than the first sampling frequency, $f_P$, for example, a multiple thereof. The position detection 611 can be advantageously carried out in contactless fashion by way of a back-side detection on the mirror 21 of the scanner 2 by virtue of the back side of the mirror 21 being optically scanned by a light beam and the reflection angle thereof being captured. The mirror movement can be detected as a consequence of the reflection angle that varies with the mirror movement. As an alternative to the process described, use can also be made of other processes for detecting the position, for example captures based on capacitive, resistive or piezoresistive operational principles. The captured scanning movement of the scanner 2, in particular, of the mirror 21, can be captured as a temporal sequence of position signals, converted into position values, and made available for further evaluations.

The scan analysis unit 6 and an image correction computer 5 yet to be described in more detail are elements or units of an evaluation unit 56. A sine and/or cosine transformation of the captured position signals can be carried out in a position function correlator 62, which is a subunit of the scan analysis unit 6, for example. Position data can be prepared. Furthermore, the form of the periodic scanning movement can be captured and taken into account when combining the images by calculation.

Figure 2A:
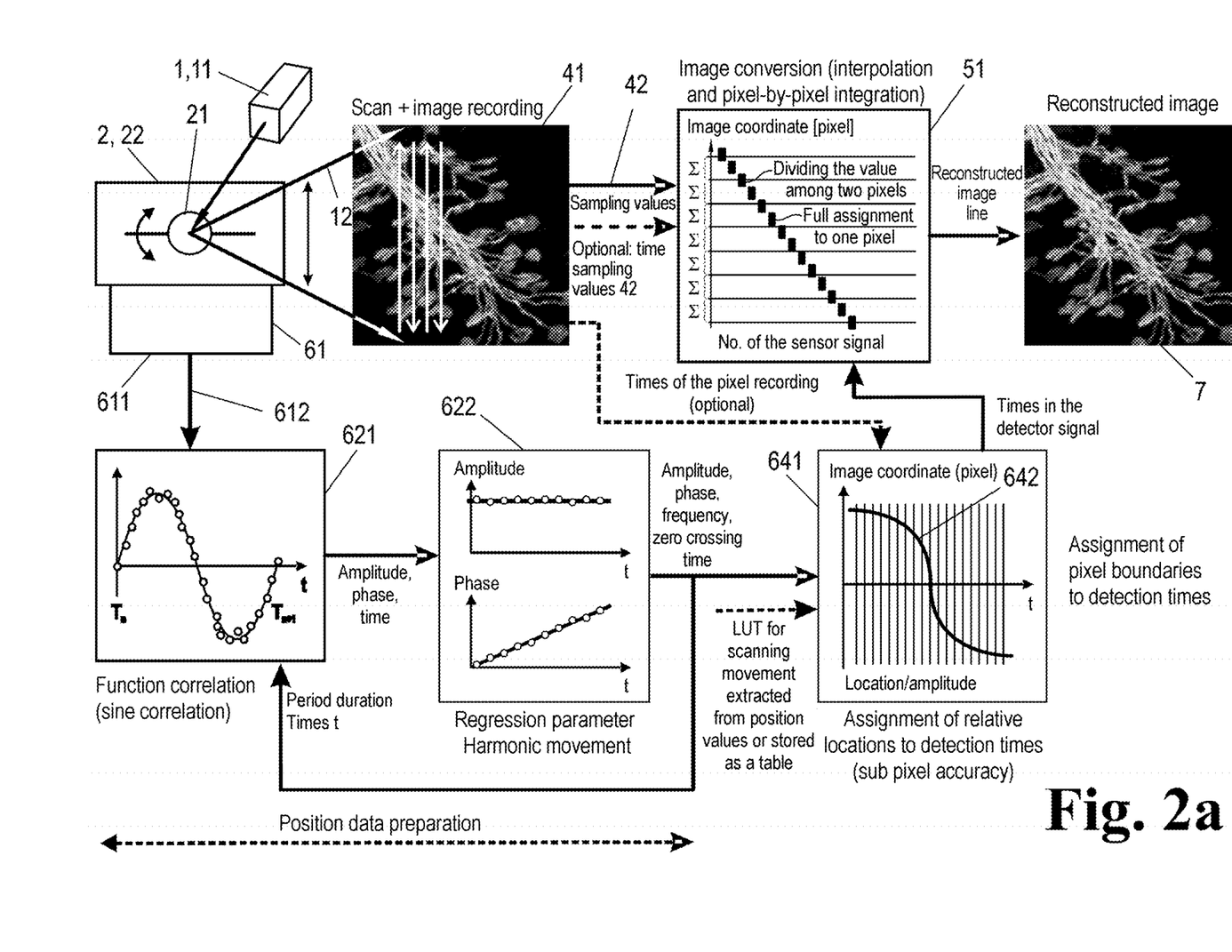
FIG. 2a: shows a schematic illustration of a first implementation of a method sequence with a representation of processing units adapted to a laser scanning microscope.
Figure 2B:
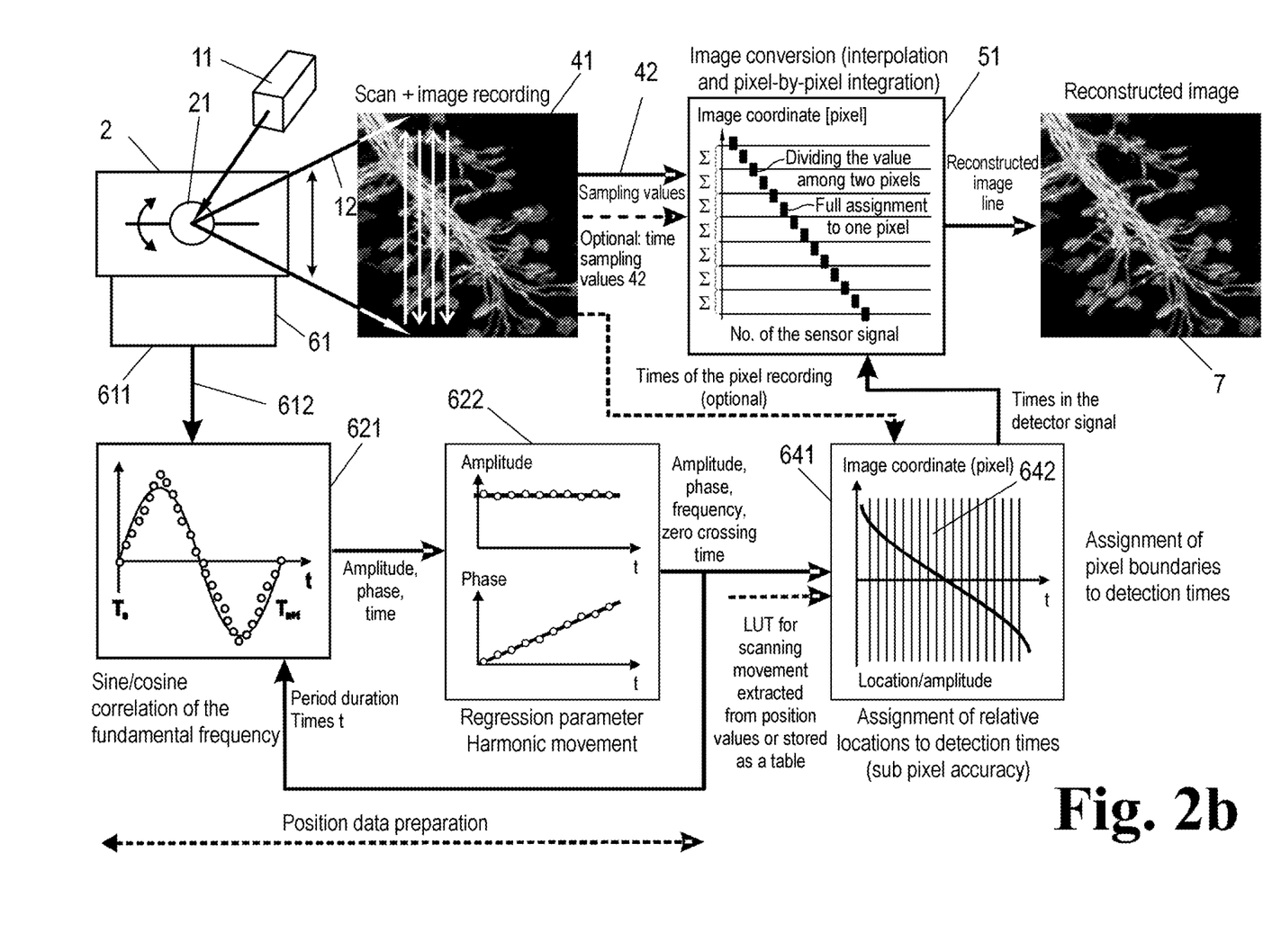
FIG. 2b: shows a schematic illustration of a second implementation of a method sequence with a representation of processing units adapted to a laser scanning microscope.

The future movement of the scanner 2 can be calculated by regression using the current values of the scanning movement (see also FIGS. 2a and 2b). Advantageously, a linear or quadratic regression can be used to this end. The estimate of the future scanning movement allows a sufficiently accurate calculation of times at which virtual boundaries of grid elements of an image sampling grid (see also FIGS. 2a, 2b) are swept over by the scanning beam.

The image sampling grid and the grid elements thereof can be set in the pixel position computer 63. Moreover, the time intervals between the boundaries or times when the boundaries are swept over by the scanning beam 12 can be calculated (or estimated) therein.

An assignment of the captured sampling values 42 of the radiation detector 4 and of the grid elements of the image sampling grid can be implemented in the image correction computer 5. As a result of the process of the assignment, the captured sampling values 42 can be converted into resultant image data of the respective grid elements. As a result, a resultant or reconstructed image 7 can be obtained from the grid elements.

FIG. 2a—building on the scanning principle displayed in stylized fashion in FIG. 1—assumes a so-called sectioning of a confocal laser scanning microscope and displays a fluorescence excitation in a scan plane of the object 3 (only labeled in FIG. 1). Laser radiation of a laser 11 serving as radiation source 1 can be guided over the mirror 21 of the scanner 2 to form a scan advancing in meandering fashion in the selected scan plane of the object 3. The fluorescence radiation excited by means of the radiation of the excitation laser 11 can be detected by means of the radiation detector 4 (only shown in FIG. 1), and an object image 4.1 captured line-by-line can be obtained. The captured sampling values 42 can be transferred to the image correction computer 51. In the latter, the assignments and the summation of the captured sampling values 42 to grid elements can be implemented. Sampling errors caused by the unsynchronized, freely oscillating scanner 2 can be corrected as a result of the assignment and summation.

The correction data required to this end can be generated as set forth below. The course of the movement (scanning movement) of the mirror 21 of the scanner 2 can be captured during a position detection 611 by means of the position detector 61 and captured by way of position signals and position data 612 obtained therefrom. An optical backside detection can be preferably carried out on the mirror 21. Here, the scanning frequency of the scanning 2 is not synchronized with the first sampling frequency, $f_P$, of the position detection 611 and the sampling frequency, $f_P$, can be substantially greater than the former, in any case. The position data 612 of the position detection 611 can be plotted against time and, as amplitude, phase and time data, can be subjected to a function correlation 621, preferably a sine and cosine transformation.

An averaged normalized movement can be calculated on the basis of the movement over time and the amplitude and phase development over time. This can be used for a lookup table (LUT) of the scanning movement. Advantageously, a harmonic analysis and back synthesis of relevant coefficients can be used for a noise-reduced LUT of the scanning movement.

To combine the sampling values 42 into image data by calculation, the times of the boundaries between the grid elements can be calculated first from the parameters of the scanning movement (amplitude, phase, zero crossings, frequency) and the LUT of the scanning movement.

In a case of a synchronous capture of the sampling values 42 relative to the first sampling cycle of the position detector 61, the sampling values 42 can be directly assigned to the grid elements.

In the case of an asynchronous capture of the sampling values 42 relative to the first sampling cycle of the position detector 61, the respective time (capture time) of the sampling values 42 needs to be captured. Using the latter, the assignment to the picture elements then can be implemented on the basis of an assignment function 642. Sampling values 42 in the vicinity of, or between, pixel boundaries can be proportionally split among the grid elements on the basis of the detection time (image conversion 51). In principle, this procedure is naturally also possible in the case of a synchronous capture.

Furthermore, the assigned sampling values 42 and the portions of sampling values 42 within the respective grid elements can be summed and normalized with respect to their number.

A reconstructed image 7 can be put together from a multiplicity of grid elements, which are output as reconstructed image lines in the example.

In FIG. 2b, a different result when determining the position data has been ascertained in the case of the same method sequence as in FIG. 2a. The scan is implemented in the form of a triangular function. Here, the position data 612 of the scanner 2 are likewise analyzed using sine and cosine correlation within the scope of the function correlation 621.

A function closer to a linear relationship arises in the example shown in FIG. 2b on account of the sine and cosine function correlated to the scanning movement and the lookup table, with the function serving to assign the relative locations to the detection times of the radiation detector 4 (see assignment function 642). Successively reconstructed image lines arise as a result, which are put together to form the resultant image 7.

Figure 3:
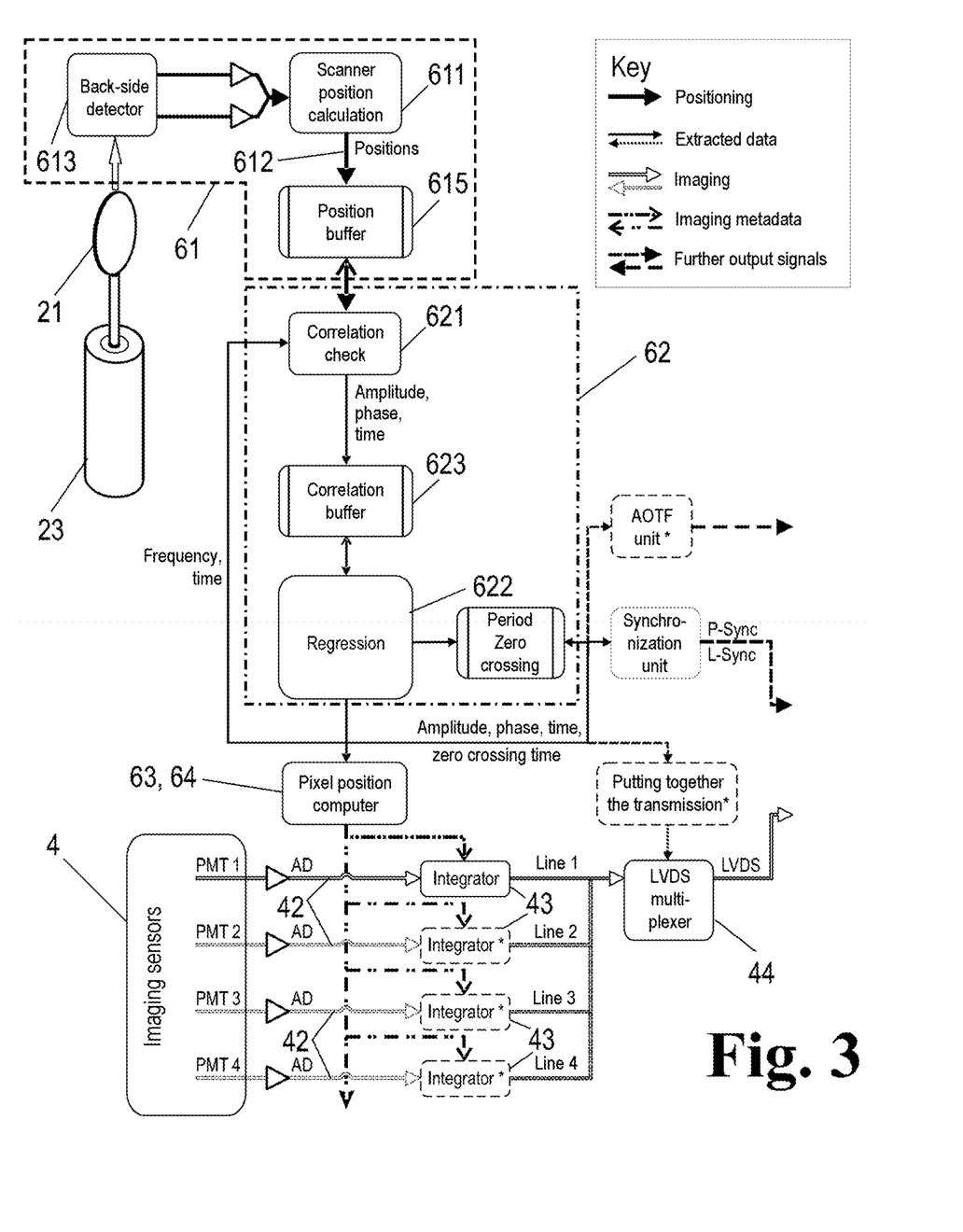
FIG. 3: shows a third exemplary embodiment of a method as a block diagram in a scanning microscope.

The above-described procedure for correcting the incorrect image sampling as a consequence of an unsynchronized scanner 2 is shown in FIG. 3 as a schematic illustration of the implementation of the invention in a scanning microscope with a freely oscillating galvanometer scanner 23. In this case, the position detector 61 includes a back-side detector 613, in which position data 612 of the scanning movement are ascertained from the position signals within the scope of the calculation of the position detection 611 and the position data are stored in a position buffer 615. Possible implementations of the back-side detector 613 are described with respect to FIG. 5 and FIG. 6.

A correlation check of the position signals of the mirror 21 recorded continually can be carried out by means of the function correlation 621 in the movement function correlator 62, and the result can be stored in a correlation buffer 623. This can be followed by an estimate of the future scanning movement by way of a regression 622. The image grid and the grid elements can be set, and the times when boundaries of the grid elements are crossed by the scanning beam 12 can be calculated in the pixel position computer 63.

On the basis of the regression 622 and a regression function derived therefrom, regression parameters can optionally be used for ascertaining zero crossing times and for a synchronization with a clock system of the scanning microscope. Moreover, data ascertained on the basis of the regression function may be made available for optional data outputs, for example, for an acousto-optic tunable filter driver (AOTF) or low-voltage differential signaling controllers (LVDS) for a data transfer of the radiation detectors 4 by means of an LVDS multiplexer 44.

By way of example, an AOTF can be driven in such a way that the same power of the scanning beam 12 (see FIGS. 1 to 2b and also 5 and 6) is directed at each scanned region of the object 3 to be imaged. Furthermore, the driving can carry out a correction of times at which a region of the object should be bleached or at which there should be no illumination by radiation of the scanning beam 12 (so-called beam blanking), as illustrated in exemplary fashion in FIG. 8.

In the actual signal channel, which is illustrated in stylized fashion in the lower part of FIG. 3, the radiation detectors 4, which, e.g., are embodied as PMT 1 to PMT 4 (photomultiplier tube) and the digital signals of which are output to a respective integrator 43, are corrected at this point of the individual signal lines (signal streams of the individual PMTs) with the data from the scan analysis unit 6. The coordinates provided by the pixel position computer 63 are assigned to the captured sampling values 42 or detector signals 42 by way of a pixel assignment distributor 64 that is integrated in the pixel position computer 63. In the respective integrator 43, the function of the image conversion 51 (labeled only in FIGS. 2*a* and 2*b*) is carried out for the individual signal streams of the captured sampling values 42. The resultant image data corrected thus are transmitted as reconstructed image lines to the LVDS multiplexer 44 for the purposes of transmitting a complete resultant image 7 (see FIG. 1, for example).

FIG. 4 once again illustrates the principle of the pixel correction according to the invention in a simplified block diagram, which shows the data processing by means of a position detector 61 for correcting the detector signal of a radiation detector 4 in question.

Figure 4:
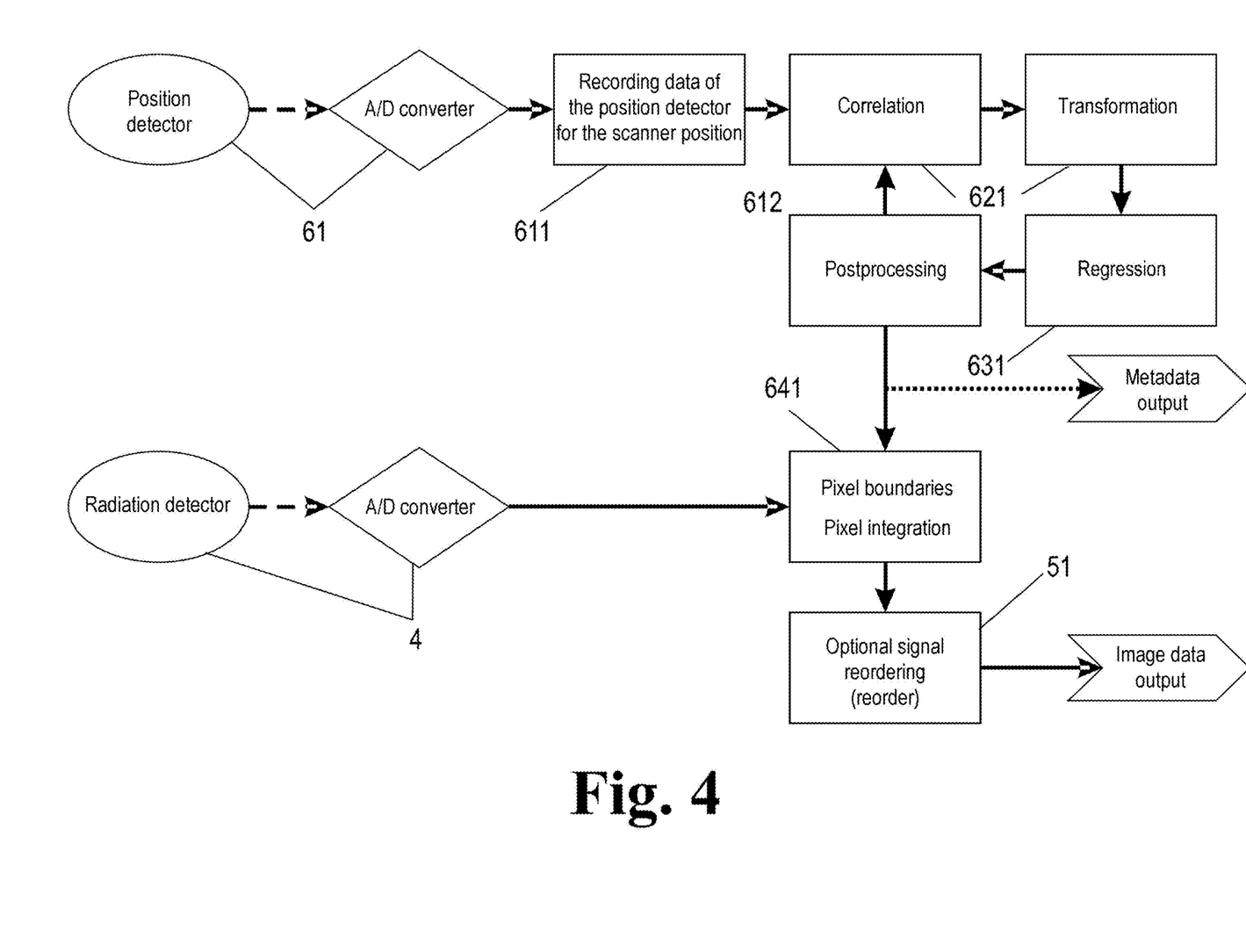
FIG. 4: shows a block diagram explaining the relationship of captured sampling values and position signals to the scanner position.
Figure 6:
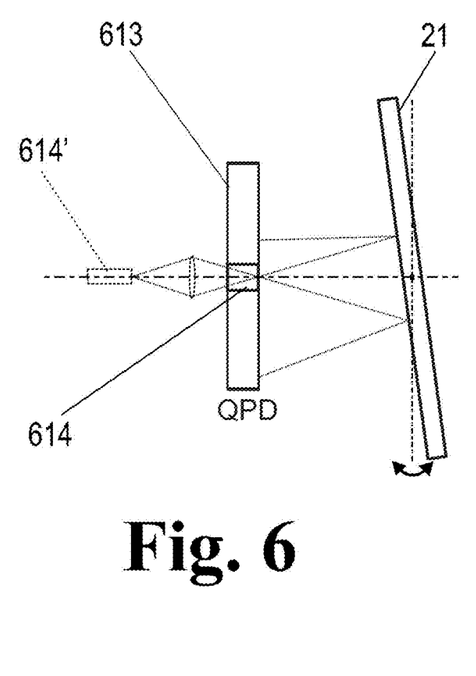
FIG. 6: shows a second exemplary embodiment of the position detector as a back-side detector with a four-quadrant diode (QPD)

Here, the position of the mirror 21 of the scanner 2 (and consequently the position of the scanning beam 12 directed at the object 3) can be calculated from the position signal of a position detector 61 in one step. In this case, this position signal might be the A/D-converted direct signal of a position-sensitive component (e.g., capacitive row of sensors, piezo-electric or piezo-resistive sensors) but also the signal from a light balance (e.g., as shown in FIG. 6) combined by calculation, in which the ratio of the difference to the sum of quantities of light that are incident on two spatially separated sensor areas (e.g., portions of a 4-quadrant diode or of a position sensitive detector (PSD, position sensitive device)) is determined. The scanning position can be ascertained continually at a sampling frequency, $f_P$, wherein the data of the scanner 2 are recorded by the position detection 611 and converted into position data 612.

The sine and cosine correlate of the position data 612 can be calculated at specified times within the step of function correlation 621 and transformation. The current phase and current amplitude of the scanning movement can be determined here. The result is a curve of amplitude and phase over time. The transformation contains the calculation of the current values of phase and amplitude from the sine and the cosine correlate, which were acquired in the second step, by way of a coordinate transformation from a Cartesian into a polar coordinate system.

In the regression step, a least squares estimator, for example, can be applied for ascertaining a regression function and for calculating the curve of amplitude and phase over time. The regression of the current values of amplitude and phases can be implemented over a plurality of measurements, in particular, over a plurality of periods.

A post-processing step contains the calculation of the currently expected values for amplitude, phase, period length, frequency, and times of the next zero crossings from the regression function. This step supplies the estimated currently expected values for amplitude, phase, and frequency. These values can be included as new auxiliary data, for instance, calculation times or period length, into the step of correlation and transformation.

In an optional intermediate step, the metadata output, the following data can be output: amplitude, period length, and times of zero crossings in digital form for controlling further components of the scanning microscope. These might be:
    generation of sync pulses for synchronization with other systems,
    control of further radiation detectors 4,
    synchronous and pixel-accurate illumination control for AOTFs, AOM (acousto-optic modulator) and/or directly modulated light sources 1,
    other processes occurring synchronously with the image sampling, up to the stimulation of a sample serving as an object 3 (e.g., electrical or optical stimulation of the sample).

The sampling values 42 of the radiation detector 4 are recorded continually, simultaneously with the position data 612. In general, recording can be carried out at a higher sampling cycle than the sampling of the position of the scanner 2.

In a further step, there can be a numerical calculation of times at which the scanning beam 12 crosses a boundary of a grid element set in advance. These times can be calculated for each individual grid element and transmitted to the integrator 43. This determination can be implemented with sub grid element accuracy.

A further step can include the pixel integration, in which image pixels are calculated from the time intervals (calculated in the previously described step) and the sampling values 42.

In a further step, there optionally can be a rearrangement of the grid elements to form the resultant image data, a removal of reversal phases of the scanning movement and optionally a filling of missing grid elements.

This can generate a data stream that contains a data value for each pixel in the normal sequence (line by line, pixel by pixel). The sampling values 42 captured during a return oscillation of the scanner can be reversed in respect of their temporal sequence so that the image data of all lines are available in a uniform read direction. Grid elements that were not sampled, for example, on account of an insufficient oscillation amplitude of the scanner 2, and that were therefore not assigned any captured sampling values 42 or resultant image data, can be assigned selected values (dummy values, random values). Thus, the captured sampling values 42 can be resorted, cropped, complemented, combined, and converted into the data stream that is output in the next (last) step, as required.

In the final step of image data output, the resultant image data are sent to the recording and/or displaying appliance (memory and/or display).

The assignment of sampling values to the scanned locations of the object, here in the form of grid elements, is illustrated schematically in FIG. 4. In this case, the upper part of FIG. 4 illustrates the acquisition of position data of the freely oscillating scanner 2 while the lower part schematically illustrates how the image data are recorded and corrected (resorted) by means of the position data.

The disclosed techniques permit the high-resolution and noise-reduced position detection of the scanning movement, i.e., the recording of the time profile of the scanner position, in view of the position of the excitation location of the scanning beam 12 of the radiation source 1 in relation to a desired ideal (metric) scanning or sampling grid in a scanning plane of the object 3. The options for the embodiment of the position detector 61 for capturing the position of the mirror 21 of the scanner 2 are diverse and range from capacitive or electromagnetic detectors via inductive and piezo-resistive detectors to optical detectors. The optical position detectors 61, which make use of the reflection of a light beam directed at the back side of the mirror 21, are advantageous here. In addition to contactless measurement, an angular resolution twice as large as the rotation angle of the freely oscillating scanner 2 is achievable. In relation to this advantageous optical detection process of the movement of the scanner 2, two advantageous embodiments of the so-called back-side detector 613 are schematically illustrated in FIG. 5 and FIG. 6.

Figure 5:
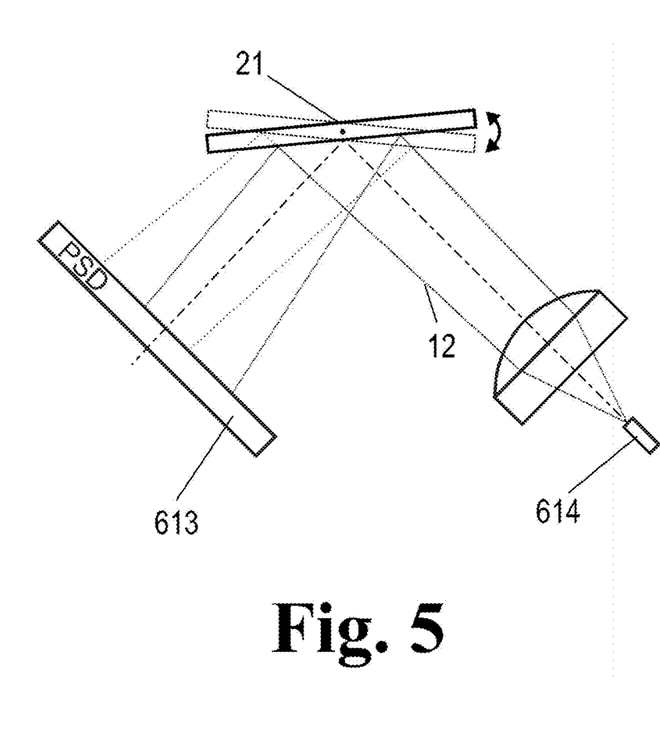
FIG. 5: shows a first exemplary embodiment of a position detector as a scanner back-side detector with a position-sensitive diode (PSD)

In the implementation as per FIG. 5, the light of a light source 614 is directed as a collimated or slightly convergent or divergent beam at the back-side surface of the mirror 21 under an oblique angle of incidence. The reflected component of the beam is captured by means of a position-sensitive detector 613, the receiver area of which is arranged in such a way that it is able to record virtually all of the reflected beam of the light source 614. Different regions of the receiver area are preferably separately evaluable in this case. To this end, a position sensitive detector (PSD), for example, a position sensitive diode, is provided in FIG. 5 as back-side detector 613 in order to capture the migration of the reflected beam within the meaning of the so-called light balance, at least of the two reversal positions of the oscillation of the mirror 21, in which light balance the ratio of the difference to the sum of quantities of light of two separate receiver areas of the PSD is determined. Alternatively, use can be made of an optical position detector that detects the light in integrated fashion from two or more regions. Then, the position can be ascertained by way of the ratio of the signals to the overall signal. Naturally, the complete curve of the scanning movement can expediently be recorded in the same way at a first sampling frequency $f_P$.

A second embodiment of the back-side detector 613, which likewise exploits the principle of the light balance, is shown in FIG. 6. In contrast to FIG. 5, use is made here of a divergent beam of a light source 614, wherein the light source 614 is arranged in a center cutout of a 4-quadrant diode (QPD) that serves as back-side detector 613 and the QPD is aligned parallel to the central position of the mirror 21 within the oscillation movement. As a result, the reflected beam of the light source 614 is displaced between the reversal points of the scanning movement of the mirror 21, in each case into different quadrants of the QPD. The position of the mirror 21 can be determined very accurately on the basis of the respective measurement values of the quadrants.

In a modified variant, illustrated using dashed lines in FIG. 6, a light source 614' can be arranged behind the QPD and its light beam can be directed at the back side of the mirror 21 through the center cutout of the QPD. The light beam emerging from the center cutout can be considered to be the light source 614. Here, the detection principle remains the same. Once again, the ratio of the difference to the sum of the quantities of light of two separate receiver areas of the QPD is determined.

As a result, the optical backside detectors 613 as per FIGS. 5 and 6 equally supply very highly resolved position data 612, which allow an exact conversion into the real scanning positions of the excitation beam and/or scanning beam 12 of the radiation source 1 of a scanning microscope over time such that the image recording of the radiation detector 4, which is not synchronized with the freely oscillating scanner 2 (see, e.g., FIG. 1), can therefore be corrected in a subsequent method (postprocessing).

Figure 7:
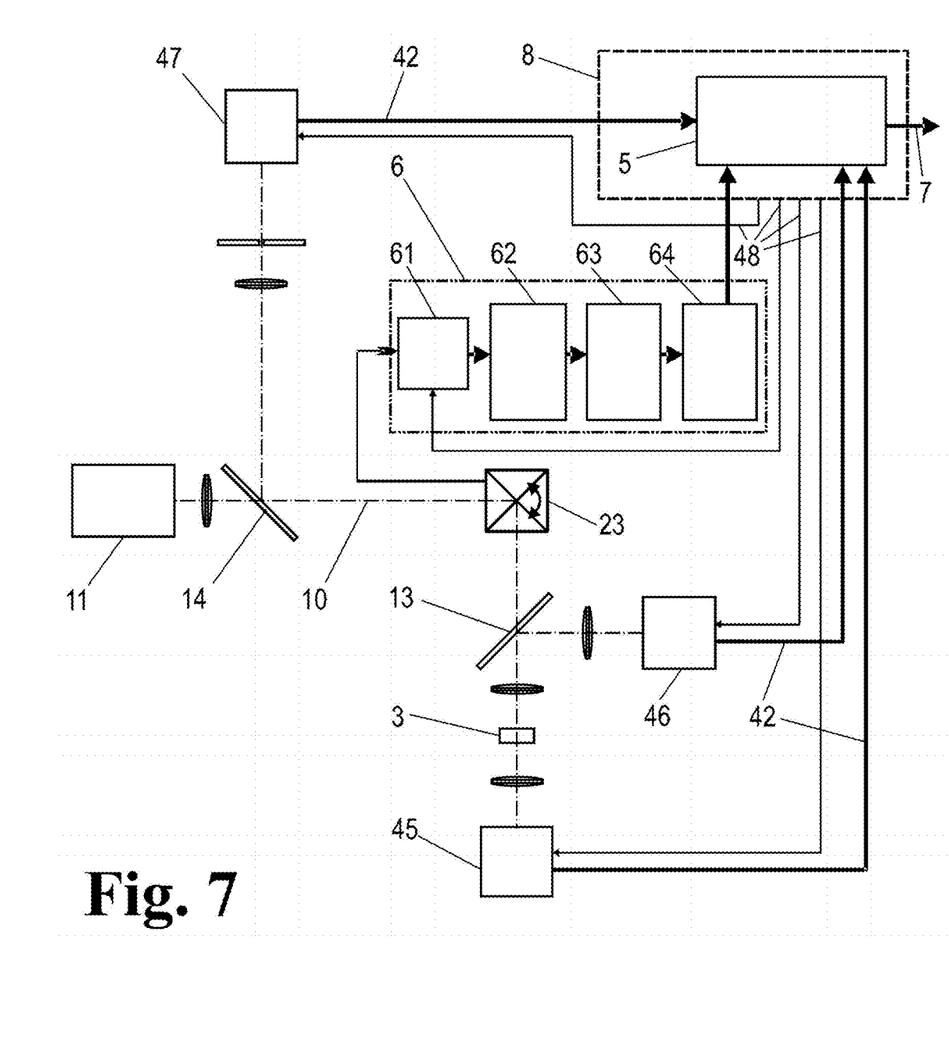
FIG. 7 shows a further embodiment in a laser scanning microscope with a plurality of detector configurations for alternative object sampling.

FIG. 7 schematically illustrates a laser scanning microscope. The microscope includes a plurality of detectors 45, 46 and 47, which act as alternative or parallel imaging radiation detectors 4, and the measurement values of which are supplied to the signal processing according to the techniques disclosed herein.

A laser 11 used as a radiation source 1 of the laser scanning microscope directs its illumination beam along the illumination beam path 10 at one or more scanners 23, the reflected beam of which is directed at the object 3 and carries out a scanning movement in a scanning plane. From the object 3 scanned line-by-line in this way, the line scan is imaged on a transmitted light detector 45 using the transmitted light principle and output coupled to a reflected light detector 46 by means of a beam splitter 13 using the reflected light principle.

Reflected, transmitted and/or scattered light or fluorescence radiation emanating from the object 3 can be passed by the beam splitter 13 depending on the wavelength and the design of said beam splitter. Light passed by the beam splitter 13 returns via the scanner/scanners 23 to a further beam splitter 14, which at least partly output couples the returning light and images the output coupled portion on the further confocal detector 47. The position detector 61 can, for example, capture position data 612 from the back side of the scanner 23 and output the respective position signal 612.

The detectors, transmitted light detector 45, reflected light detector 46, and confocal detector 47, can be arranged to be spatially separate from the image correction computer 5 and therefore have dedicated processing electronics, which are coupled via the clock lines 48 with a base cycle to an evaluation and processing unit 8. The captured sampling values 42, in particular, detector signals 42 from the transmitted light detector 45, the reflected light detector 46, and the confocal detector 47, and the image coordinates from the pixel position computer 63, which were calculated in the scan analysis unit 6, are likewise supplied to the evaluation and processing unit 8 via data lines. Here, current amplitude, current phase, frequency, and time curve are calculated from the position data 612 from the position detector 61 with the aid of a function correlation 621—as described above in relation to FIG. 2a or FIG. 2b—and a regression is carried out. Then, the sub pixel accurate assignment of the relative locations to the detection times of the detectors 45, 46 and 47 is implemented in the pixel assignment distributor 64. Reconstructed images 7 are put together in each case by the image correction computer 5 in the evaluation and processing unit 8 from the individual sampling values 42 from transmitted light, reflected light and confocal detector 45, 46, 47.

Using the apparatus described above on the basis of the method according to the invention, it is possible to obtain point accurate metric image recordings using a scanning image recorder without requiring precision scanners under complex closed-loop control or corrected precision scanners, with this apparatus even having greater robustness in relation to thermally induced changes in the scanning movement.

Figure 8:
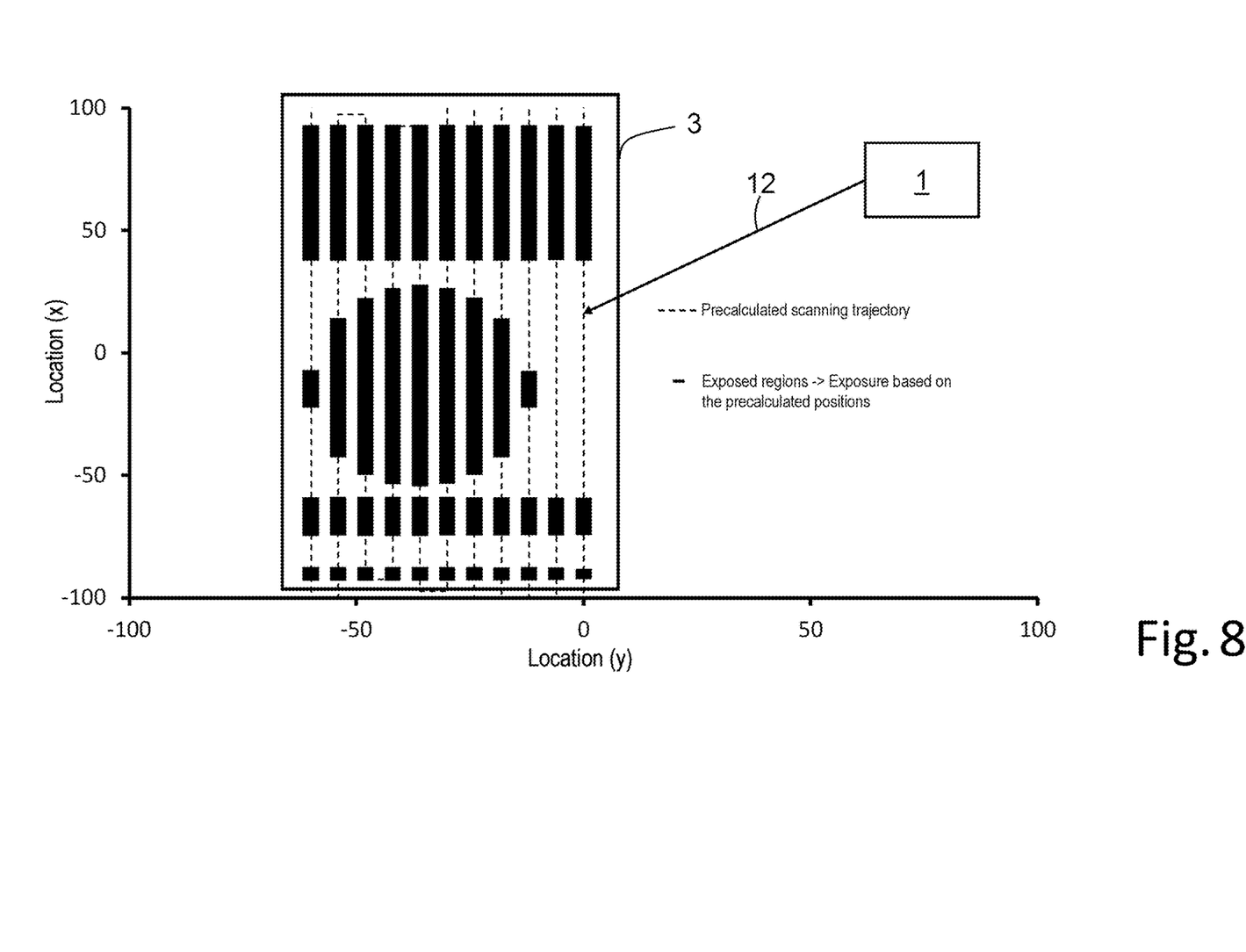
FIG. 8 shows a schematic illustration of an implementation of a method sequence for spatially resolved manipulation of an object, in which regions of the object are illuminated and other regions of the object remain unilluminated.

By way of example, the estimate of the future scanning movement can be used to manipulate a sample, for example a biological sample, serving as an object 3. By way of example, if a preceding evaluation of an overview image of the object 3 has disclosed what regions of the object 3 should be manipulated in a certain way in each case, the light source 1 can be controlled accordingly when the scanning beam 12 illuminates the relevant grid elements (scanner 2 not shown). FIG. 8 schematically shows the future trajectory of the scanning movement as a broken solid line. The regions of the object 3 that are filled in black are intended to be bleached by means of the radiation of the scanning beam 12. On account of the known future scanning movement, it is possible to correspondingly control the light source 1, for example switch the latter on or off. In addition, or as an alternative thereto, it is also possible to introduce filters or shutters (not illustrated) into the beam path of the scanning beam 12, or remove these therefrom.

In further implementations of the method according to the invention, an activation or excitation of dyes or the release of encapsulated substances (e.g., release of caged compounds) can be brought about in the selected regions by means of an appropriate control of the light source 1.

The invention claimed is:

1. A method for capturing an image of an object, in which at least one scanning beam is guided along a scanning trajectory over the object using at least one scanner, wherein a scanning movement is at least intermittently periodic in at least one direction, the method comprising:
   sampling the scanning movement of the at least one scanner with a first sampling cycle at a first sampling frequency for detecting and capturing a current position of the scanner as position values;
   capturing radiation emanating from the object as captured sampling values with a second sampling cycle at a second sampling frequency;
   calculating current values of an amplitude and a phase of the scanning movement of the at least one scanner;
   calculating the current amplitude, phase, and/or frequency and future changes in the amplitude, phase, and/or frequency over time based on previously calculated current values;
   setting an image grid, grid elements of which are assigned the sampling values based on times at which the scanning beam respectively crosses or will cross at least one boundary of the grid elements being calculated by means of a movement function and the current amplitude, phase, and/or frequency; and
   wherein the sampling values of each grid element captured within these times are assigned to and combined in the relevant grid element as resultant image data.

2. The method as claimed in claim 1,
   wherein the second sampling cycle at the second sampling frequency is asynchronous in time with respect to the first sampling cycle at the first sampling frequency, and
   wherein capturing times of the time-asynchronous sampling are recorded and taken into account when assigning the sampling values to the grid elements.

3. The method as claimed in claim 1, wherein the movement function is adapted based on an analysis of position values and/or sampling values.

4. The method as claimed in claim 1, wherein the movement function is sinusoidal or triangular or sawtooth and/or the movement function is available in tabulated form or as a parameter of a harmonic synthesis or spline function.

5. The method as claimed in claim 1, wherein the first sampling frequency is less than or equal to the second sampling frequency.

6. The method as claimed in claim 1, wherein the captured sampling values have a time at which the scanning beam crosses a boundary of two grid elements are proportionally assigned to the relevant grid elements.

7. The method as claimed claim 1, wherein the captured sampling values assigned to a grid element are summed and normalized.

8. The method as claimed in claim 1, wherein grid elements with the captured sampling values are converted group-by-group into grid elements with resultant image data.

9. The method as claimed in claim 1, wherein the times for calculating further current values of amplitude, phase, and/or frequency are selected based on the current phase and/or frequency.

10. The method as claimed in claim 1, wherein the grid elements are equidistant or distorted in at least one of their dimensions and/or wherein the grid two- or three-dimensional and the directions of the two- or three-dimensional grid deviate from the directions of the scanning movement.

11. The method as claimed in claim 1, wherein illumination radiation selectively impinges on grid elements based on the movement function and an estimated future curve of the scanning movement, with a wavelength, intensity and/or polarization of the illumination radiation being set on a grid element-individual basis.

12. The method as claimed in claim 1, wherein a plurality of scanning beams are guided along a plurality of scanning trajectories over the object using at least one scanner, wherein the scanning beams have a spatial offset with respect to one another in at least one direction and the sampling values are combined to form a resultant image with the spatial offset being taken into account or different regions of the image grid are combined with the sampling values from the plurality of scanning trajectories to form a resultant image or captured sampling values of different scanning beams are used for different channels of a resultant image.

13. An apparatus for capturing an image of an object, the apparatus comprising:
   at least one scanner configured for guiding a scanning beam over the object along a scanning trajectory, wherein a scanning movement of the scanner is at least intermittently periodic in at least one direction;
   at least one position detector configured for sampling the scanning movement of the scanner with sampling cycles at a first sampling frequency;
   at least one radiation detector configured for capturing radiation emanating from the object as captured sampling values with a second sampling cycle at a second sampling frequency; and
   an evaluation unit configured to:
      calculate current values of an amplitude and the phase of a scanning movement of the at least one scanner;
      estimate or calculate future changes of amplitude, phase, and/or frequency over time based on the calculated current values by virtue of ascertaining a movement function for estimating future changes in the amplitude and the phase over time based on the calculated current values;
      set an image grid, grid elements of which are assigned the captured sampling values by virtue of times at which the scanning beam respectively crosses or will cross at least one boundary of the grid elements being calculated by means of the ascertained movement function, and sum the sampling values of each grid element captured within these times and assign these to the relevant grid element as resultant image data, and
      put together the grid elements of the image data from a plurality of regions to form a resultant image.

* * * * *

UNITED STATES PATENT AND TRADEMARK OFFICE
CERTIFICATE OF CORRECTION

| | | |
|---|---|---|
| PATENT NO. | : 12,007,544 B2 | Page 1 of 1 |
| APPLICATION NO. | : 17/309007 | |
| DATED | : June 11, 2024 | |
| INVENTOR(S) | : Kaufhold et al. | |

It is certified that error appears in the above-identified patent and that said Letters Patent is hereby corrected as shown below:

On the Title Page

Column 2, Item (56), in "Other Publications", Line 1, delete "Apn" and insert -- Apln --, therefor.

In the Claims

In Column 15, Claim 7, Line 55, after "claimed" insert -- in --.

In Column 16, Claim 13, Line 42, delete "the" and insert -- a --, therefor.

In Column 16, Claim 13, Line 43, delete "a" and insert -- the --, therefor.

Signed and Sealed this
Twenty-third Day of July, 2024

Katherine Kelly Vidal
*Director of the United States Patent and Trademark Office*